United States Patent [19]
Ware

[11] 3,888,233
[45] June 10, 1975

[54] FIGURE WITH SIMULATED HEARTBEAT

[75] Inventor: H. Joe Ware, La Crescenta, Calif.

[73] Assignee: Kamar Incorporated, Gardena, Calif.

[22] Filed: Jan. 17, 1974

[21] Appl. No.: 434,352

[52] U.S. Cl............... 128/1 C; 46/232; 331/108 A
[51] Int. Cl............................................. A61b 19/00
[58] Field of Search.......... 128/1 C, 2.05 R, 2.05 S; 46/232; 331/108 A, 111

[56] References Cited
UNITED STATES PATENTS

| | | | |
|---|---|---|---|
| 3,024,568 | 3/1962 | Barnett | 46/232 |
| 3,373,315 | 3/1968 | Colman | 331/108 A |
| 3,384,074 | 5/1968 | Rautiola et al. | 128/1 C |
| 3,563,229 | 2/1971 | Petrusson | 128/1 C |

Primary Examiner—Dalton L. Truluck
Attorney, Agent, or Firm—Herzig & Walsh

[57] ABSTRACT

Circuit means including a speaker for producing sound simulating a heartbeat such as a heartbeat of a human being. A battery powered transistorized oscillator circuit is provided whereby to produce output pulses at the rate of 60–90 cycles per minute which activate the speaker to produce sounds simulating a heartbeat and at approximately the same rate. The device may be used in a figure, such as a plush toy or plush animal toy, the microphone being positioned so that the sound simulates that of a heart. The sound produced is made to simulate a heartbeat of a mother to lull baby animals, and human infants as well, to sleep.

5 Claims, 2 Drawing Figures

FIGURE WITH SIMULATED HEARTBEAT

SUMMARY OF THE INVENTION

The invention is a simplified circuit means and speaker whereby to simulate a heartbeat, the speaker being positioned in a doll or figure toy such as a plush toy or plush animal toy. The device is constructed to produce pulses of sound in the speaker at the rate of 60–90 cycles per minute thus simulating a typical heartbeat rate. The particular purpose or object of the invention is to provide the simulated heartbeat which is useful for purposes of lulling baby animals and/or human infants to sleep by way of simulation of the heartbeat of the mother which may be a human mother. The invention may of course have other novelty purposes.

BACKGROUND OF THE INVENTION

The background in the art resides in the following U.S. Pats. Nos. 2,859,731; 2,954,642; 2,957,273; 3,137,092; 3,154,881; 3,232,004; 3,316,491; 3,384,074; and 3,563,229. Of these, U.S. Pat. Nos. 2,957,273; 3,384,074; and 3,563,229 use electric or electronic circuitry to produce pulses to simulate the heartbeat. The herein invention utilizes a simplified solid state oscillator circuit powered by a low voltage battery for producing pulses in the speaker. In the preferred circuit, one PNP and one NPN transistors are used in the oscillator circuit. The oscillator and speaker can be very simply and easily packaged for assembly in a figure toy with the low voltage batteries in a waterproof case and with one or more exterior snap switches, for example, for turning the device on and off. A doll or figure toy may be any one of various types already known made of different materials such as plastic, rubber, or otherwise.

With respect to the soothing effect of the sound of a relaxed mother's heartbeat, reference is made to the discussion in U.S. Pat. No. 3,563,229. The sound of a relaxed mother's heartbeat has a very soothing effect on infants, whether animal or human.

A further object of the herein invention is to provide a simulated heartbeat means by way of a particular form of oscillator circuit using a low voltage battery power source, the means or system being readily adaptable for assembly within figure toys and the like.

A further object is to realize a transistorized and controlled oscillator or pulse beat circuit, operative from low voltage and capable of producing spaced output pulses each comprising a relatively large spike and a relatively small spike which when applied to a speaker transducer produces sounds simulating an animal or human heart beat.

BRIEF DESCRIPTION OF THE DRAWINGS

Further objects and additional advantages of the invention will become apparent from the following detailed description and annexed drawings, wherein.

DESCRIPTION OF THE PREFERRED EMBODIMENT

Figure 1:
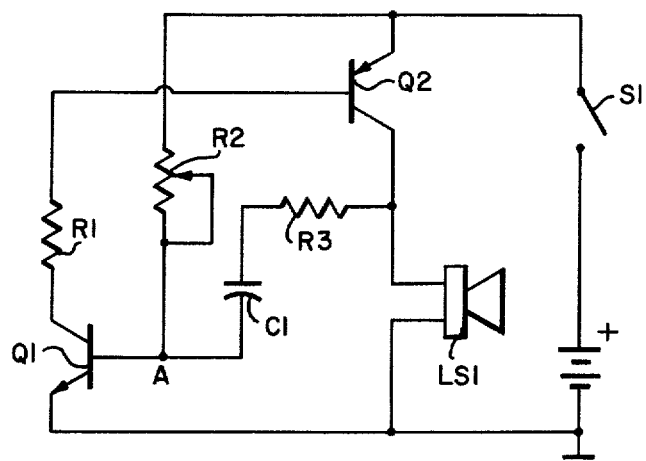
FIG. 1 is a circuit diagram of a preferred form of oscillator circuit used to produce the simulated heartbeat.

Referring to the drawings, numeral 10 shows pictorially a form of figure toy which is shown as a plush toy constituted by a teddy bear figure. This type of toy may be made of various materials, such as plastic and covered with fabric, preferably fuzzy and simulating fur.

Incorporated in the toy animal 10 is an oscillator circuit shown in FIG. 1, for simulating the heartbeat of the animal.

The oscillator circuit shown in FIG. 1 is an astable regenerative clock pulser type of oscillator which will generate pulses as long as the switch controlling its operation is closed and its power supply provides a voltage signal of sufficient magnitude to trigger oscillation.

Referring to FIG. 1, the oscillator is made up of a NPN transistor Q1; a PNP transistor Q2; resistors R1, R2, and R3; a capacitor C1; a loudspeaker LS1; an on-off switch S1; and a battery power supply B.

The battery B, which may be a standard 1.5 volt dry cell battery, has its positive terminal connected through switch S1 to the emitter electrode of the transistor Q2 and has its negative terminal connected to a common voltage bus G which defines circuit ground. Of course, more than one battery may be used.

Connected between the collector electrode of the transistor Q2 and circuit ground G is the loudspeaker LS1. Connected in series between the collector electrode of the transistor Q2 and the base electrode of the transistor Q1 are the resistor R3 and capacitor C1. The variable resistor R2 is connected from the base electrode of the transistor Q1 to the emitter electrode of the transistor Q2. The resistor R1 is connected from the collector electrode of the transistor Q1 to the base electrode of the transistor Q2. The emitter electrode of transistor Q1 is connected to ground G. The junction point to which the resistor R2, capacitor C1, and the base electrode of Q1 are commonly connected is designated A in FIG. 1.

In operation, the oscillator of FIG. 1 when oscillating, generates a series of spaced apart pulse groups at a selected output rate, preferably in the range of 60–90 cycles per second. Each pulse group, as hereinafter explained, is made up of a first pulse followed by a second pulse of lesser magnitude.

Upon closure of switch S1, capacitor C1 is charged by battery B through the circuit path defined between its positive and negative terminals by resistor R2, capacitor C1, resistor R3, and loudspeaker LS1. Resistor R2 is made to have a value much larger than the combined resistance of resistor R3 and the resistance of loudspeaker LS1. Thus, the variable resistance at which R2 is set essentially determines the charging rate of capacitor C1. Accordingly, the setting of the variable resistor R2 determines the time delay between cycles of the oscillator and its cycle rate can be set by appropriately setting the resistance of R2.

The capacitor C1 is charged until a voltage is stored on its plate common with the base electrode of Q1 sufficient to forward bias the base-emitter junction of transistor Q1. This voltage, for example, may be one volt over the voltage potential on system ground G.

With the base-emitter junction of Q1 forward biased, the collector-emitter current path of the transistor Q1 is biased into a conductive state with the result that the voltage on ground G initially appears on the base electrode of Q2. Thereby, the base-emitter junction of transistor Q2 is forward biased to switch transistor Q2 into a conductive state.

The transistors Q1 and Q2 are now both in a conductive state with the result that the following flows of current are established: a relatively large current flows through the collector-emitter path of Q2 and the loudspeaker LS1 to generate a first pulse simulative of heartbeat; a relatively smaller current flows from the collector electrode of Q2 through R3 to charge the plate of capacitor C1 common with R3; a current flows through the emitter-collector path of Q1 and the resistor R1 to develop a voltage drop across R1 with the result that the voltage on the base electrode of Q2 increases to reverse bias the emitter-base junction of Q2 and switch Q2 to a nonconductive state; and a current flows through the emitter-base path of Q1 to discharge the plate of C1 common to the base electrode of Q1 until this capacitor plate is sufficiently discharged to reverse bias the base-emitter junction of Q1 and switch Q1 to its conductive state.

With transistors Q1 and Q2 now switched to a nonconductive state, the charge accumulated on the plate of capacitor C1 common with R3 discharges through the current path defined by R3 and the loudspeaker LS1 to generate a second sound pulse, smaller than the first, simulative of heartbeat.

The oscillator circuit now recycles to generate another group of sound pulses in the manner above-described and will continue oscillating as long as switch S1 is closed. As before-mentioned, the cycle rate of the oscillator circuit is determined by the resistance value of variable resistor R2. It is noted that the time period over which the pulse group extends is determined by the value of R3. The resistance at which R2 is set may, for example, be 50,000 ohms, while a suitable value for resistor R3 would be 400-500 ohms. A suitable capacitance for capacitor C1 is 10 microfarads, and the loudspeaker LS1 may have an impedance of 5-8 ohms. Resistor R3 may be variable.

Figure 2:
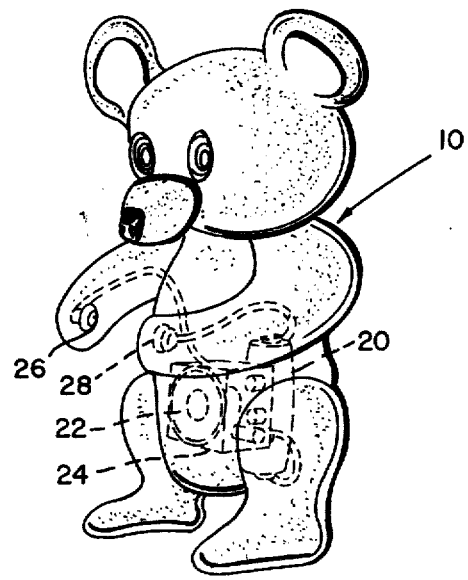
FIG. 2 is a pictorial view of a figure toy having the means of the invention embodied therein.

FIG. 2 shows a plush toy in the form of a small bear having the heartbeat unit assembled in it. The battery may be held in a clip having leads connected to the clip or may be in a water-proof casing 20 as shown with the leads connected to it. Speaker 22 may be simply packed in with the stuffing of the plush toy, or it may be in a housing 24 as shown having other components in it, the terminals being on the housing. In a preferred form of the invention, the components of the oscillator (FIG. 1), including the resistors, transistors, and capacitor will be simply miniature units which are wired together and then may be simply held in assembled relationship by having plastic or other adhesive material applied thereto and allowed to solidify. Preferably, switches are provided as designated at 26 and 28, which may be in the paws of the figure for turning off the unit so as to minimize the utilization of the battery. In one form of the invention, the plush toy or figure has an outer covering, and there may be provided a small zipper opening through which the heartbeat unit can be simply inserted and removed.

The components are chosen for economy voltage and proper sound level. The low power requirements (power handling capacity) of the transistors, the small capacitor (10 microfarads, for example), and the current limiting resistors allow the circuit to run constantly at 65 beats per second for 300 to 500 hours on two AA size 1.5 V batteries in parallel. The beat rate is adjustable from 50 beats/minute to 150 beats/minute, with 65 to 70 as optimum. The circuitry can be set up to provide a range of 60-90 beats/minute or on the other hand, 50-150 beats/minute.

The foregoing disclosure is representative of a preferred form of the invention and is to be interpreted in an illustrative rather than a limiting sense, the invention to be accorded the full scope of the claims appended hereto.

What is claimed is:

1. In a device having a body which simulates a living figure, the combination of means to emit an audible sound simulating a heartbeat in the figure, said means comprising an oscillator circuit whereby to produce electrical pulses of a pre-determined duration and spacing and a speaker including a tranducer connected to produce audible sounds having a characteristic frequency and duration and a quality resembling heartbeats, said oscillator including a first transistor and a second transistor, resistors, a battery and switch means, circuit means including a capacitor and at least one of said resistors with a connection to the base of the first transistor for rendering said first transistor conductive upon charging of the capacitor, means whereby the conductance of the first transistor controls the conductance of the second transistor, circuit means between the second transistor and the said transducer to provide a first pulse to the transducer, and to oppositely charge the capacitor, and means to discharge said capacitor to render the first transducer non-conductive and to further discharge said capacitor to provide a further pulse in the transducer.

2. A device as in claim 1, wherein the transistors are connected to short the capacitor whereby to produce a said relatively large pulse closely followed by a smaller pulse applied to the transducer.

3. A device as in claim 2, including a variable resistor in the capacitor charging circuit.

4. A device as in claim 2, wherein the collector of said second transistor is connected to the base of said first transistor.

5. A device as in claim 2, wherein said components are wired and assembled together, said figure having an opening whereby the assembly may be inserted into the interior of the figure opening and then closed.

* * * * *